(12) United States Patent
Ban

(10) Patent No.: US 8,780,967 B2
(45) Date of Patent: Jul. 15, 2014

(54) CHANNEL PHASE ESTIMATION APPARATUS, DEMODULATOR, AND RECEIVING APPARATUS

(71) Applicant: Koichiro Ban, Kawasaki (JP)

(72) Inventor: Koichiro Ban, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 38 days.

(21) Appl. No.: 13/724,813

(22) Filed: Dec. 21, 2012

(65) Prior Publication Data

US 2013/0243063 A1    Sep. 19, 2013

(30) Foreign Application Priority Data

Mar. 15, 2012  (JP) ................................ 2012-059334

(51) Int. Cl.
*H04L 1/00*  (2006.01)

(52) U.S. Cl.
USPC ........... 375/226; 375/316; 375/340; 375/346; 375/348; 375/354; 375/362; 375/370; 375/371

(58) Field of Classification Search
USPC ......... 375/316, 340, 346, 348, 226, 354, 362, 375/370, 371
See application file for complete search history.

(56) References Cited

U.S. PATENT DOCUMENTS

| 5,960,044 | A | 9/1999 | Montreuil | |
|---|---|---|---|---|
| 2008/0232497 | A1* | 9/2008 | Hart et al. | 375/260 |

FOREIGN PATENT DOCUMENTS

| JP | 10-75226 A | 3/1998 |
|---|---|---|
| JP | 2004-088806 A | 3/2004 |

OTHER PUBLICATIONS

Japanese Office Action dated Jun. 11, 2013 (and English translation thereof) in counterpart Japanese Application No. 2012-059334.
Jun-ichi Abe, Katsuya Nakahira, and Kiyoshi Kobayashi; "Proposal and Basic Characteristic Evaluation of Blind Phase Compensation Method for Direct Spectrum Division Transmission"; Technical Research Report of Institute of Electronics; Information, Communication Engineers; Aug. 18, 2011; vol. 111, No. 179, pp. 105-109; NTT Access Network Service Systems Laboratories, Kanagawa, Japan.
Applicant-provided Background Art Information Sheet, Jun. 22, 2012.

* cited by examiner

*Primary Examiner* — Siu Lee
(74) *Attorney, Agent, or Firm* — Holtz Holtz Goodman & Chick PC

(57) ABSTRACT

According to one embodiment, a channel phase estimation apparatus includes a phase memory, subtractor, multiplier, and adder. The phase memory is configured to store a first phase estimation value up to a (k−1)-th (for k=1, 2, . . . , K) symbol. The subtractor is configured to calculate a difference value between a phase value of one carrier of a k-th symbol and the first phase estimation value. The multiplier is configured to multiply the difference value by a weight. The adder is configured to add a value output from the multiplier and the first phase estimation value to output a second phase estimation value up to the k-th symbol.

10 Claims, 4 Drawing Sheets

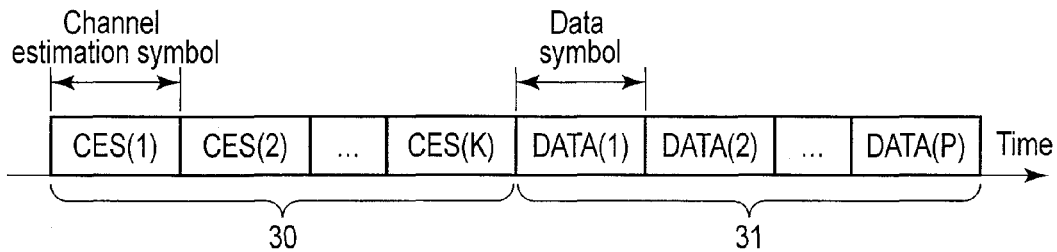
F I G. 3
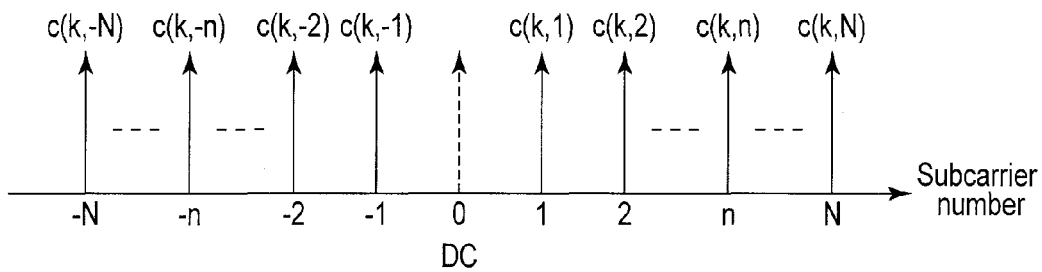
F I G. 4
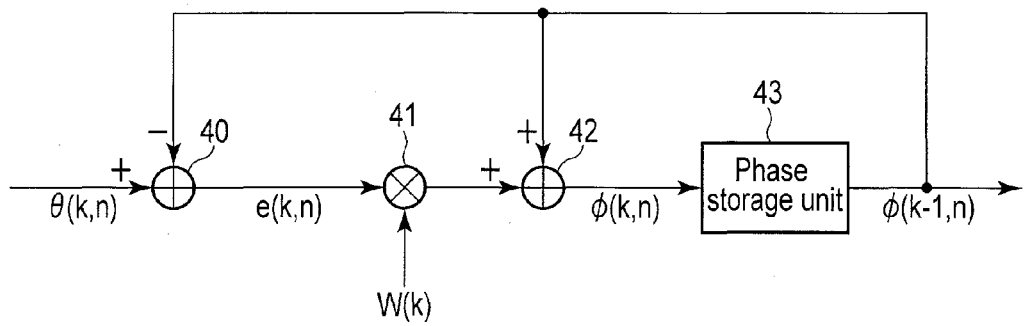
F I G. 5

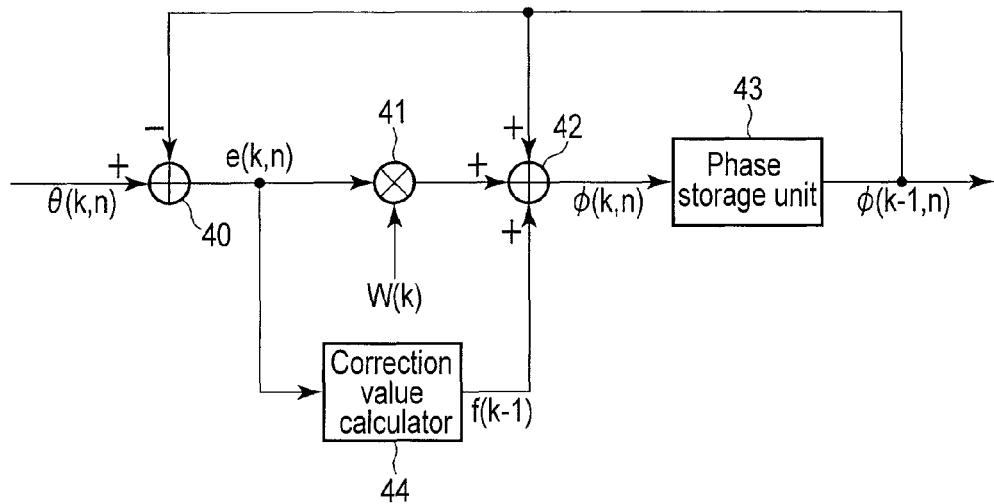
F I G. 6
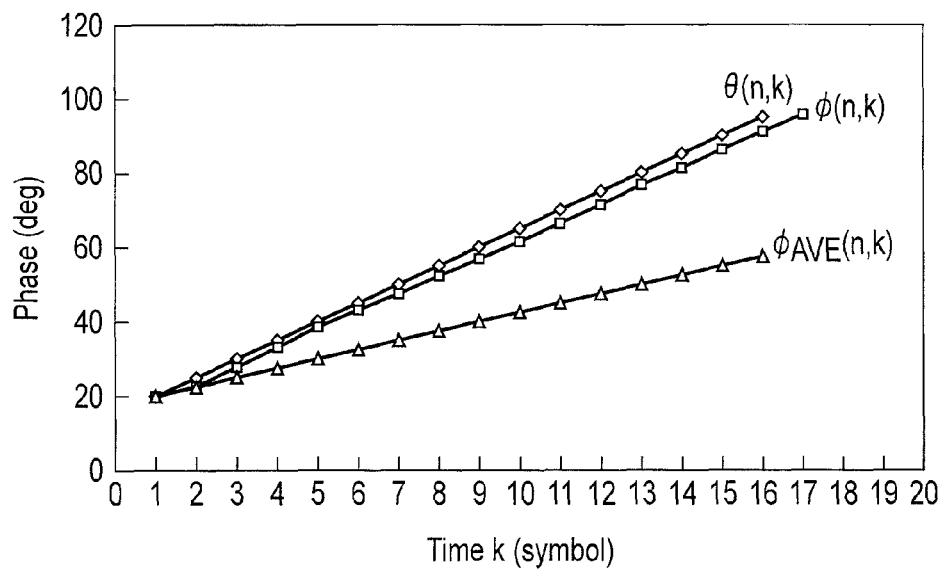
F I G. 7

CHANNEL PHASE ESTIMATION APPARATUS, DEMODULATOR, AND RECEIVING APPARATUS

CROSS-REFERENCE TO RELATED APPLICATIONS

This application is based upon and claims the benefit of priority from Japanese Patent Application No. 2012-059334, filed Mar. 15, 2012, the entire contents of which are incorporated herein by reference.

FIELD

Embodiments described herein relate generally to a channel phase estimation apparatus, demodulator, and receiving apparatus, which are used in wireless communications.

BACKGROUND

In a receiving apparatus and the like of a wireless communication system, it is known that communication channel estimation is attained using polar coordinates. Some known channel phase estimation apparatuses applied to such use application attain phase estimation in consideration of discontinuity of phases.

BRIEF DESCRIPTION OF THE DRAWINGS

FIG. 3 is a view showing a frame format of a wireless communication system;

FIG. 4 is a chart showing an FFT output example of channel estimation symbols;

FIG. 5 is a block diagram of a phase estimation apparatus according to the first embodiment;

FIG. 6 is a block diagram of a phase estimation apparatus according to the second embodiment;

FIG. 7 is a graph showing a change in phase value with respect to a time (symbol)

DETAILED DESCRIPTION

In general, according to one embodiment, a channel phase estimation apparatus includes a phase memory, subtractor, multiplier, and adder. The phase memory is configured to store a first phase estimation value up to a (k−1)-th (for k=1, 2, ..., K) symbol. The subtractor is configured to calculate a difference value between a phase value of one carrier of a k-th symbol and the first phase estimation value. The multiplier is configured to multiply the difference value by a weight. The adder is configured to add a value output from the multiplier and the first phase estimation value to output a second phase estimation value up to the k-th symbol.

Embodiments will be described hereinafter with reference to the drawings.

(First Embodiment)

Figure 1:
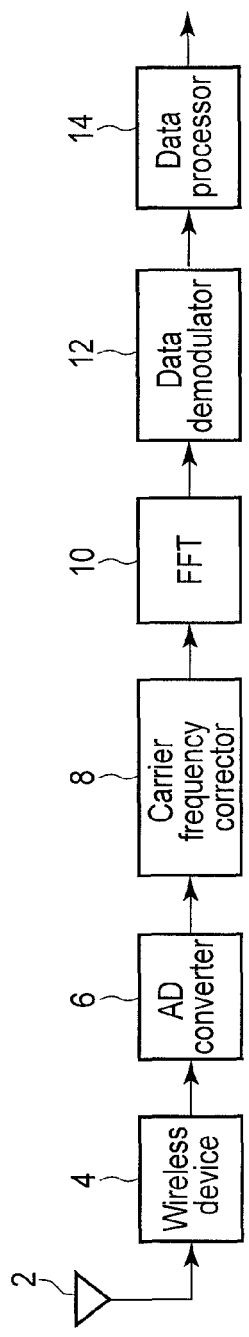
FIG. 1 is a block diagram showing an OFDM receiving apparatus to which a phase estimation apparatus according to an embodiment is applied.
Figure 2:
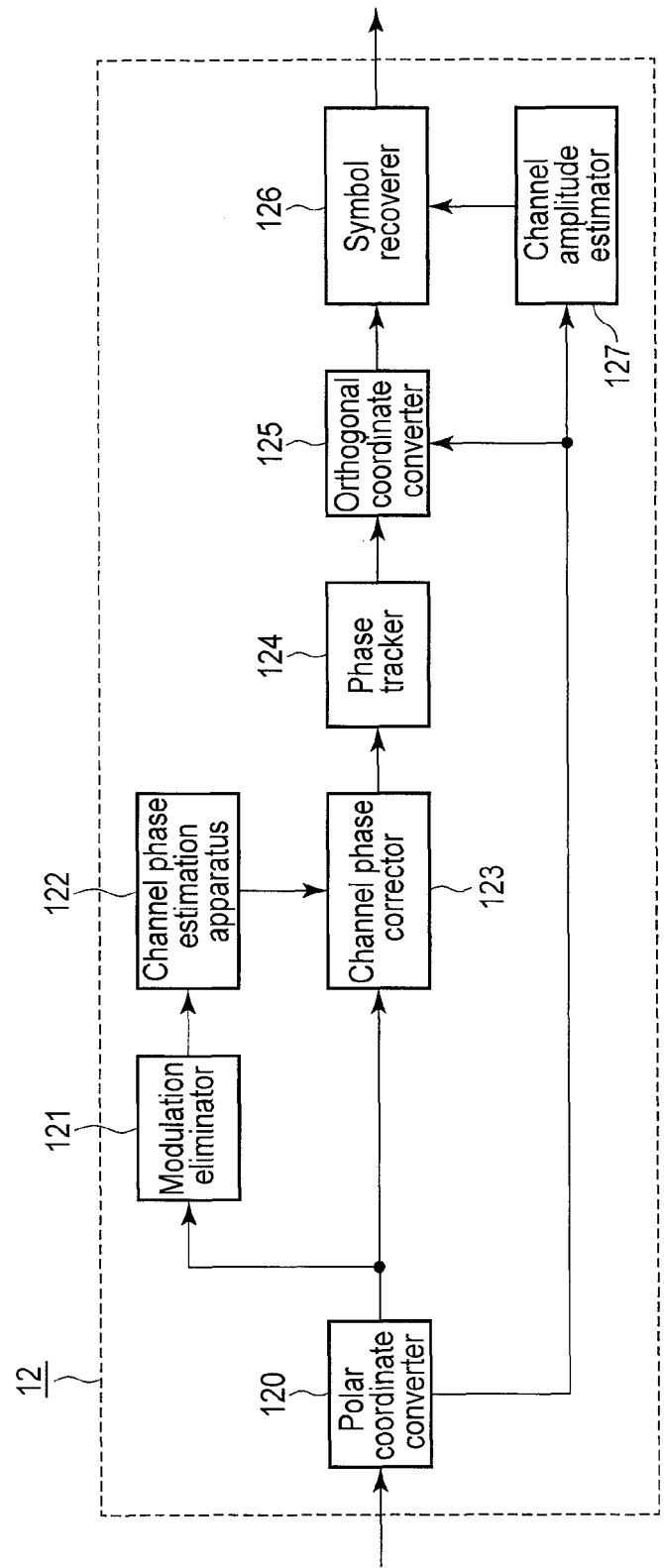
FIG. 2 is a block diagram of a demodulator (data demodulator)

FIG. 1 is a block diagram showing one arrangement example of an OFDM receiving apparatus according to an embodiment. As shown in FIG. 1, the OFDM receiving apparatus includes an antenna 2, wireless device 4, AD converter 6, carrier frequency corrector 8, FFT (Fast Fourier Transformer) 10, data demodulator 12, and data processor 14. As shown in FIG. 2, the data demodulator 12 includes a polar coordinate converter 120, modulation eliminator 121, channel phase estimation apparatus 122, channel phase corrector 123, phase tracker 124, orthogonal coordinate converter 125, symbol recoverer 126, and channel amplitude estimator 127.

FIG. 3 shows an example of a frame format of a wireless communication system to which the channel phase estimation apparatus 122 according to the embodiment is applicable. A channel estimation sequence 30 and data sequence 31 are arranged along a time axis. The channel estimation sequence 30 is a given sequence required to attain channel estimation that makes allowances for the influences of frequency selectivity and frequency errors which are generated in transmission channels and analog circuits. Using a channel estimation result, equalization/demodulation processing of data symbols included in the data sequence 31 is executed. As shown in FIG. 3, when the channel estimation sequence 30 includes a plurality of channel estimation symbols (CES), average processing and weighted addition processing are executed using these symbols, thereby calculating channel estimation values with an improved signal-to-noise power ratio (SNR). This embodiment features the arrangement of the channel phase estimation apparatus 122 when such channel estimation processing is executed particularly using polar coordinates.

Referring to FIG. 1, a radio signal received by the antenna 2 is converted into a baseband signal by a local frequency oscillator included in the wireless device 4. This baseband signal is converted into a digital signal by the AD converter 6. This digital signal undergoes frequency correction by the carrier frequency corrector 8. That is, the carrier frequency corrector 8 corrects a frequency difference of digital signals output from the AD converter 6 by applying a phase rotation corresponding to the frequency difference between a carrier frequency of a transmitting apparatus and a local frequency of the OFDM receiving apparatus. However, due to the presence of phase noise and limited calculation precision and estimation precision of the carrier frequency corrector 8, and the like, the frequency difference normally cannot be perfectly corrected in general. Therefore, an input signal to the FFT 10 includes phase variations due to phase noise and a residual frequency offset.

The FFT 10 applies Fourier transformation processing to a channel estimation symbol or data symbol based on the digital signal corrected by the carrier frequency corrector 8, and outputs IQ quadrature signals for respective subcarriers. FIG. 4 shows an example of output signals from the FFT 10 with respect to a k-th (k=1, 2, ..., K) channel estimation symbol CES(k). To have, as the center, a DC carrier (subcarrier number 0), which is null and is not used, there are N subcarriers on each of the positive frequency side and negative frequency side, and a total of M=2N subcarriers are used. In FIG. 4, c(k, n) is a complex signal value, which expresses an output signal of the FFT 10 with respect to an n-th subcarrier of the k-th channel estimation symbol using IQ quadrature coordinates.

The data demodulator 12 executes channel phase estimation and channel amplitude estimation based on the IQ quadrature signals output from the FFT 10, thereby recovering data symbols. The data symbols recovered by the data demodulator 12 are processed by the data processor 14.

The arrangement and operation of the data demodulator 12 will be described in detail below with reference to FIG. 2.

The polar coordinate converter 120 executes polar coordinate conversion for an n-th subcarrier of a k-th channel estimation symbol from the complex signal value c(k, n)

expressed by IQ quadrature coordinates into a phase value and amplitude value. Assuming that each subcarrier of the channel estimation symbol is a signal point which has undergone given phase modulation such as BPSK or QPSK, the modulation eliminator 121 outputs a phase value θ(k, n) obtained by canceling a given phase q(k, n) due to modulation from the output phase value of the polar coordinate converter 120. The phase value θ(k, n) output from the modulation eliminator 121 is given by:

$$\text{Phase value:} \theta(k,n) = \angle c(k,n) - q(k,n) \tag{1}$$

Also, an amplitude value r(k, n), which is output from the polar coordinate converter 120 and is input to the channel amplitude estimator 127, is given by:

$$\text{Amplitude value:} r(k,n) = |c(k,n)| \tag{2}$$

In this case, assume that the phase value assumes a value rounded to 0 to 2π or −π to π. Note that the phase elimination of the channel estimation symbol may be executed first using IQ quadrature coordinates, and the polar coordinate converter 120 may then calculate a phase value and amplitude value, thus obtaining values equivalent to equations (1) and (2).

The channel phase estimation apparatus 122 according to this embodiment executes channel phase estimation of each subcarrier based on the phase value θ(k, n) output from the modulation eliminator 121. This embodiment intends to minimize storage capacities of storage devices such as a register and memory required for the channel phase estimation. More specifically, in this embodiment, only one phase value needs to be held for a subcarrier to be estimated.

Even when a correction value calculator 44 (to be described later) is included, only a storage capacity to hold M+2 phase values at most is required for the channel phase estimation of M subcarriers. Since the correction value calculator 44 calculates one value per symbol, and its output is delayed by one symbol, two storage capacities, that is, that used to calculate a correction value in the correction value calculator 44 and that for an output from the calculator 44 need only be assured.

FIG. 5 is a block diagram showing the channel phase estimation apparatus 122 according to the first embodiment. The channel phase estimation apparatus 122 according to the first embodiment does not include the correction value calculator 44. The channel phase estimation apparatus 122 according to the second embodiment (to be described later) includes the correction value calculator 44.

As shown in FIG. 5, the channel phase estimation apparatus 122 according to the first embodiment includes a subtractor 40 which calculates a difference e(k, n) between a phase value θ(k, n) of an n-th (−N<=n<=N) subcarrier of a k-th (k=1, 2, . . . , K) OFDM symbol and a first phase estimation value φ(k−1, n) up to a (k−1)-th OFDM symbol, a multiplier 41 which outputs an output value e(k, n)W(k) by multiplying the difference e(k, n) output from the subtractor 40 by a weight W(k), an adder 42 which outputs a second phase estimation value Q(k, n) up to the k-th OFDM symbol by adding the output value e(k, n)W(k) output from the multiplier 41 and the first phase estimation value φ(k−1, n), and a phase memory 43 which stores the first phase estimation value φ(k−1, n) or second phase estimation value Q(k, n).

A phase estimation value φ(k, n) of an n-th subcarrier, which is newly stored in the phase memory 43 in FIG. 4 in a k-th channel estimation symbol time, is calculated based on a phase estimation value φ(k−1, n) of the n-th subcarrier, which is estimated based on up to a (k−1)-th channel estimation symbol and is stored in the phase memory 43, as given by:

$$\phi(k,n) = \phi(k-1,n) + W(k)e(k,n) \quad k=1, 2, \ldots, K \tag{3}$$

$$e(k,n) = \theta(k,n) - \phi(k-1,n) \tag{4}$$

Note that all initial values φ(0, n) of phase estimation values of respective subcarriers held in the phase memory 43 are zero.

The weight W(k) can be φ(1, n)=θ(1, n) when k=1, and W(1)=1. In the case of W(k) (1<k<=K), 0<W(k)<1, as will be described later.

Since a final channel phase estimation value of the n-th subcarrier calculated from the channel estimation sequence 30 including K symbols is a channel phase estimation value φ(K, n) of the n-th subcarrier at a symbol time k=K, calculation results given by equations (5) and (6) are obtained using equations (3) and (4):

$$\phi(K, n) = \sum_{k=1}^{K} C(k)\theta(k, n) = \phi_{AVE}(K, n) \tag{5}$$

$$C(k) = W(k) \prod_{j=k+1}^{K} (1 - W(j)) \tag{6}$$

$$= \begin{cases} W(K) & (k = K) \\ \dfrac{W(k)}{W(k+1)}(1 - W(k+1))C(k+1) & (1 \leq k < K) \end{cases}$$

As can be seen from equations (5) and (6), a weighted addition of phases applied with different weights C(k) for respective symbols can be made by controlling the value of the weight W(k) in equation (3). However, since equation (5) is an expedient mathematical expression under the assumption that there is no phase discontinuity, when equation (5) is directly calculated from C(k) and θ(k, n), a desired calculation result cannot be obtained. In this manner, by weighted addition processing using a plurality of channel estimation symbols for respective subcarriers, channel phase estimation values can be realized by a minimum required storage capacity.

Note that since a total of the weights C(k) is required to be "1", the weight W(k) has to satisfy the condition described by:

$$\sum_{k=1}^{K} C(k) = \sum_{k=1}^{K} W(k) \prod_{j=k+1}^{K} (1 - W(j)) = 1 \tag{7}$$

The weight W(k) applied to the multiplier 41 of the channel phase estimation apparatus 122 will be described below.

FIRST EXAMPLE

In the first example of the weight W(k), in order to apply the same weight to all channel estimation symbols, that is, to set C(k)=1/K, the weight W(k) is set, as given by:

$$W(k) = \frac{1}{k} \quad (k = 1, 2, \ldots, K) \tag{8}$$

SECOND EXAMPLE

In the second example of the weight W(k), in order to facilitate the implementation of the first example, an approximate setting is made so as to express 1/W(k) by the power of 2, as given by:

$$W(k) = \frac{1}{2^{R(k)}} \quad (k = 1, 2, \ldots, K) \tag{9}$$

where R(k) is a positive integer which meets:

$$\lfloor \log 2(k) \rfloor \leq R(k) \leq \lceil \log 2(k) \rceil \tag{10}$$

For example, this also includes R(k)=round(log 2(k)). Note that $\lfloor x \rfloor$, $\lceil x \rceil$, and round(x) respectively mean a maximum integer equal to or smaller than x, a minimum integer equal to or larger than x, and an integer closest to x.

THIRD EXAMPLE

In the third example of the weight W(k), in order to decrease weights by half with respect to a decrease in k except for k=1 so as to set C(K)=0.5, C(k−1)=0.50(k) (k=3, 4, . . . , K), and C(2)=C(1), W(k) is set, as given by:

$$W(k) = \begin{cases} 1 & (k = 1) \\ 1/2 & (1 < k \leq K) \end{cases} \tag{11}$$

In addition to the aforementioned three examples, a weight required for a desired weight C(k) can be derived from equation (6). In general, the weight W(k)>0. Therefore, as can be seen from equation (6), a condition required for this is 0<W(k)<1 (k=2, 3, . . . , K).

(Second Embodiment)

The channel phase estimation apparatus 122 of the second embodiment includes a correction value calculator 44, as shown in FIG. 6. The correction value calculator 44 calculates an average value of a plurality of difference values output from the subtractor 40 for a plurality of subcarriers, and calculates a common correction value f(k) to subcarriers by multiplying the average value by a constant α (α is a real number equal to or larger than 0 and equal to or smaller than 1). In the second embodiment, the adder 42 adds a correction value f(k−1), which is calculated one symbol before and is output from the correction value calculator 44, a value e(k, n)W(k) output from the multiplier 41, and a phase estimation value φ(k−1, n) output from the phase memory 43. Thus, a corrected second phase estimation value φ(k, n) up to a k-th OFDM symbol can be calculated.

The operation of the second embodiment will be described below.

A phase estimation value φ(k, n) of an n-th subcarrier, which is newly stored in the phase memory 43 in FIG. 6 in a k-th channel estimation symbol time, is calculated based on a phase estimation value φ(k−1, n) of the n-th subcarrier, which is estimated based on up to a (k−1)-th channel estimation symbol and is stored in the phase memory 43, as given by:

$$\phi(k, n) = \phi(k - 1, n) + W(k)e(k, n) + f(k - 1) \tag{12}$$
$$k = 1, 2, \ldots, K$$

$$e(k, n) = \theta(k, n) - \phi(k - 1, n) \tag{13}$$

$$f(k) = \alpha \frac{1}{N_f} \sum_n e(k, n) \tag{14}$$

Note that all initial values φ(0, n) of phase estimation values of respective subcarriers held in the phase memory 43 are zero. Likewise, an initial value f(0) of an output value of the correction value calculator 44 is also zero. Phase values are defined by −π to π or 0 to 2π. However, when these values are simply averaged, a value quite different from that to be calculated is obtained due to phase discontinuity at π or 0. Hence, differences e(k, n) are calculated once, and are then added, thus executing the weighted addition while avoiding a problem caused by phase discontinuity.

The weight W(k) can be φ(1, n)=θ(1, n) when k=1, and W(1)=1. In case of W(k) (1<k<=K), 0<W(k)<1, as described above.

In equation (14), $N_f$ is the number of subcarriers, differences e(k, n) of which are to be added, and equation (14) represents a value obtained by multiplying the average value of e(k, n) by α. Since there are distortions such as FFT timing errors which cause phase rotations inverted to be symmetrical about a DC carrier, when a plurality of subcarriers are to be averaged, an average is preferably calculated for the same subcarriers to be symmetrical about the DC carrier. That is, both e(k, n) and e(k, −n) are preferably used in calculations of an average value.

Since a final channel phase estimation value of the n-th subcarrier calculated from the channel estimation sequence 30 including K symbols is a channel phase estimation value φ(K, n) of the n-th subcarrier at a symbol time k=K, calculation results given by equations (15) and (16) are obtained using equations (12) to (14):

$$\phi(K, n) = \sum_{k=1}^{K} C(k)\theta(k, n) + \beta(K) = \phi_{AVE}(K, n) + \beta(K) \tag{15}$$

$$C(k) = W(k) \prod_{j=k+1}^{K} (1 - W(j)) \tag{16}$$
$$= \begin{cases} W(K) & (k = K) \\ \frac{W(k)}{W(k+1)}(1 - W(k+1))C(k+1) & (1 \leq k < K) \end{cases}$$

As can be seen from equations (15) and (16), a weighted addition of phases applied with different weights C(k) for respective symbols can be made by controlling the value of the weight W(k) in equation (12). However, since equation (15) is an expedient mathematical expression under the assumption that there is no phase discontinuity, when equation (15) is directly calculated from C(k) and θ(k, n), a desired calculation result cannot be obtained. In this manner, by weighted addition processing using a plurality of channel estimation symbols for respective subcarriers, channel phase estimation values can be realized by a minimum required storage capacity.

Note that since a total of the weights C(k) is required to be "1", the weight W(k) has to satisfy the condition described by:

$$\sum_{k=1}^{K} C(k) = \sum_{k=1}^{K} W(k) \prod_{j=k+1}^{K} (1 - W(j)) = 1 \quad (17)$$

β(K) calculated from a calculation value of the correction value calculator 44 is a correction term of a phase rotation common to all subcarriers, and represents a phase rotation caused to be common to all subcarriers, such as a frequency offset and CPE (Common Phase Error) of phase noise.

Since the output f(K) of the correction value calculator 44 for a K-th symbol is not reflected in the calculation results of equations (15) and (16), a value given by equation (18) below can be used as a final channel phase estimation value in place of equations (15) and (16) by further advancing a calculation by one symbol time.

$$\phi(K+1,n) = \phi(K,n) + f(K) \quad (18)$$

Since this is equivalent to a case in which equations (12) to (14) are calculated up to k=K+1 while W(K+1)=0 in them, the calculations can be made without changing the arrangement of the channel phase estimation apparatus 122 of this embodiment shown in FIG. 6.

The operation of the correction value calculator 44 will be described in detail below. Even under the assumption that there are no variations of transmission channels themselves during an interval of the channel estimation sequence 30, when there are a residual frequency offset and phase noise, phases of respective subcarriers rotate (vary) along with an elapse of time. A channel phase to be estimated by the channel phase estimation apparatus 122 so as to demodulate the data sequence 31 is a phase value immediately before the data sequence 31. The channel phase estimation apparatus 122 according to the second embodiment can improve the estimation precision by increasing a signal-to-noise power ratio using K channel estimation symbols, as described above, and the correction value calculator 44 makes a channel phase estimation calculation to follow phase rotations caused to be common to all subcarriers.

FIG. 7 is a view (No. 1) for explaining an operation example of the correction value calculator 44. In this example, K=16, and all weights C(k) in equation (15) are equal to each other while setting W(k)=1/k (k=1, 2, ..., K). Assuming that all subcarriers suffer phase rotations in the same direction due to the influence of, for example, a residual frequency offset, a phase value of an n-th subcarrier at a k-th symbol time can be expressed by:

$$\theta(k,n) = \psi + (k-1)\Delta \quad (19)$$

where ψ is a phase value ψ=20 [deg] when k=1, and a phase rotation per symbol is Δ=5 [deg]. As can be seen from FIG. 7, a channel phase estimation value $\phi_{AVE}$ (k, n), which does not include any error correction given by equation (15), and an actual phase value θ(k, n) are largely diverged from each other along with an elapse of time. When the error correction is skipped, α=0 in equation (14), and β(k)=0 in equation (15).

φ(n, k) in FIG. 7 is calculated by setting α=½. As can be seen from FIG. 7, phase rotations caused by frequency offsets can be tracked. A value suited to α when all weights are equal to each other roughly falls within a range from 0.5 to 0.8. When φ(K, n) is used as a final channel phase estimation value, relatively small α is used, and when φ(K+1, n) is used, relatively large α is used, thereby easily enhancing the phase following precision.

Figure 8:
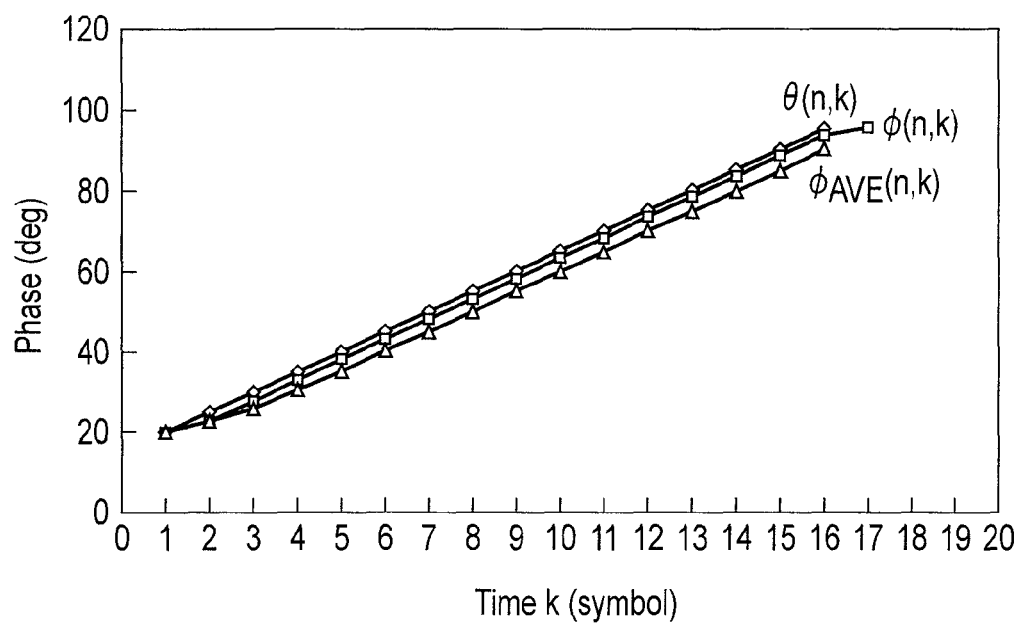
FIG. 8 is a graph showing a change in phase value with respect to a time (symbol).

FIG. 8 is a view (No. 2) for explaining an operation example of the correction value calculator 44. Phase values are input to the channel phase estimation apparatus 122 under the same conditions as those shown in FIG. 7 and described by equation (19). The weight is set to be W(1)=1 and W(k)=½ (k=2, 3, ..., K). φ(n, k) in FIG. 8 is a calculation result when α=¼. When weights which decrease by half are used, a new phase value is added with a large weight. Hence, a value smaller than FIG. 7 is suited to α for error correction, and α suited to this weight roughly falls within a range from 0.25 to 0.5.

(Demodulation of Data Sequence)

How to demodulate the data sequence 31 in the data demodulator 12 using a channel phase estimation value φ(n) of the n-th subcarrier calculated by the channel phase estimation apparatus 122 according to the aforementioned embodiment will be described below using FIG. 2.

Letting $\theta_{DATA}(k, n)$ and $r_{DATA}(k, n)$ be respectively an amplitude and phase of the n-th subcarrier of the k-th data symbol, which are calculated by the polar coordinate converter 120, an output phase of the channel phase corrector 123 can be calculated by:

$$\theta_A(k,n) = \theta_{DATA}(k,n) - \phi(n) \quad (20)$$

The phase tracker 124 corrects phase variations of data symbols caused by residual carrier frequency offsets and clock frequency offsets. For example, when some subcarriers of a data symbol are pilot subcarriers which transmit given data, the influence caused by frequency offsets can be estimated from phase rotations in a time direction and those in a frequency direction. Letting λ(k, n) be a phase variation value estimated by the phase tracker 124, an output phase of the phase tracker 124 can be calculated by:

$$\theta_B(k,n) = \theta_A(k,n) - \lambda(k,n) = \theta_{DATA}(k,n) - \phi(n) - \lambda(k,n) \quad (21)$$

The orthogonal coordinate converter 125 calculates IQ quadrature coordinate signals from amplitude values $\lambda_{DATA}$ (k, n) and corrected phase values $\theta_B(k, n)$ by:

$$x(k,n) = r_{DATA}(k,n)\cos(\theta_B(k,n))$$

$$y(k,n) = r_{DATA}(k,n)\sin(\theta_B(k,n)) \quad (22)$$

On the other hand, the channel amplitude estimator 127 calculates a channel amplitude estimation value by averaging amplitudes r(k, n) of channel estimation symbols by:

$$r(n) = \frac{1}{K}\sum_{k=1}^{K} r(k, n) \quad (23)$$

The symbol recoverer 126 recovers a data symbol of the nth subcarrier of the k-th data symbol from equations (22) and (23). Finally, the data demodulator 12 outputs estimated values of IQ quadrature signals of transmission data, as given by:

$$d_{ICH}(k,n) = x(k,n)/r(n)$$

$$d_{QCH}(k,n) = y(k,n)/r(n) \quad (24)$$

The data processor 14 shown in FIG. 1 executes transmission data estimation from the output data of the data demodulator 12. In general, when error correction codes and the like are appended, the data processor 14 includes an error correction code decoder.

The OFDM communication system has been described. As for phase estimation in a single-carrier system, phase calculations can be made by the same arrangement of the channel phase estimation apparatus 122 under the assumption that the number of subcarriers is 1 in the above description.

As described above, according to this embodiment, the channel phase estimation apparatus which can greatly reduce the storage capacity of a storage device required to calculate channel phase values, and can calculate precise channel phase values by correcting frequency offsets and phase noise can be implemented. This embodiment is suited to the OFDM receiving apparatus of the wireless communication system such as the OFDM communication system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A channel phase estimation apparatus comprising:
   a phase memory configured to store a first phase estimation value up to a (k−1)-th (for k=1, 2, ..., K) symbol;
   a subtractor configured to calculate a difference value between a phase value of one carrier of a k-th symbol and the first phase estimation value;
   a multiplier configured to multiply the difference value by a weight; and
   an adder configured to add a value output from the multiplier and the first phase estimation value to output a second phase estimation value up to the k-th symbol.

2. The apparatus of claim 1, further comprising a correction value calculator configured to calculate a correction value f(k) common to carriers by calculating an average value of the difference values for a plurality of carriers and multiplying the average value by a constant $\alpha$ ($\alpha$ is a real number not less than 0 and not more than 1),
   wherein the adder adds a correction value f(k−1) calculated one symbol before, the value output from the multiplier, and the first phase estimation value up to the (k−1)-th symbol to output a corrected second phase estimation value up to the k-th symbol.

3. The apparatus of claim 1, wherein the weight is W(k)=1/k (for k=1, 2, ..., K).

4. The apparatus of claim 1, wherein the weight is W(k)=½^r(k) (for k=1, 2, ..., K, r(k) is a minimum integer not less than log 2(k) and not more than 1 or a maximum integer not more than log 2(k) and not less than 1).

5. The apparatus of claim 1, wherein the weight is W(1)=1 and W(k)=½ (for k=2, 3, ..., K).

6. The apparatus of claim 2, wherein the weight is W(k)=1/k (for k=1, 2 ..., K), and
   the constant $\alpha$ is not less than 0.5 and not more than 0.8.

7. The apparatus of claim 2, wherein the weight is W(k)=½^r(k) (for k=1, 2, ..., K, r(k) is a minimum integer not less than log 2(k) and not more than 1 or a maximum integer not more than log 2(k) and not less than 1), and
   the constant $\alpha$ is not less than 0.5 and not more than 0.8.

8. The apparatus of claim 2, wherein the weight is W(1)=1 and W(k)=½ (for k=2, 3, ..., K), and
   the constant $\alpha$ is not less than 0.25 and not more than 0.5.

9. A demodulator comprising:
   a polar coordinate converter configured to convert a signal of one carrier of a k-th (for k=1, 2, ..., K) symbol into a phase value expressed by polar coordinates;
   a channel phase estimation apparatus configured to estimate a channel phase value from the phase value expressed by the polar coordinates output from the polar coordinate converter; and
   a recoverer configured to recover a symbol based on a channel phase estimation result of the channel phase estimation apparatus,
   the channel phase estimation apparatus comprising:
   a phase memory configured to store a first phase estimation value up to a (k−1)-th (for k=1, 2, ..., K) symbol;
   a subtractor configured to calculate a difference value between the phase value output from the polar coordinate converter and the first phase estimation value;
   a multiplier configured to multiply the difference value by a weight; and
   an adder configured to add a value output from the multiplier and the first phase estimation value to output a second phase estimation value up to the k-th symbol.

10. A receiving apparatus, which comprises an antenna configured to receive a radio signal, a wireless device configured to convert the radio signal into a baseband signal, an AD converter configured to convert the baseband signal into a digital signal, and a demodulator configured to execute demodulation based on the digital signal,
    the demodulator comprising: a polar coordinate converter configured to convert a signal of one carrier of a k-th (for k=1, 2, ..., K) symbol into a phase value expressed by polar coordinates; a channel phase estimation apparatus configured to estimate a channel phase value from the phase value expressed by the polar coordinates output from the polar coordinate converter; and a recoverer configured to recover a symbol based on a channel phase estimation result of the channel phase estimation apparatus,
    the channel phase estimation apparatus comprising:
    a phase memory configured to store a first phase estimation value up to a (k−1)-th (for k=1, 2, ..., K) symbol;
    a subtractor configured to calculate a difference value between a phase value of one carrier of a k-th symbol and the first phase estimation value;
    a multiplier configured to multiply the difference value by a weight; and
    an adder configured to add a value output from the multiplier and the first phase estimation value to output a second phase estimation value up to the k-th symbol.

* * * * *